(12) United States Patent
Sanghavi et al.

(10) Patent No.: US 11,563,987 B2
(45) Date of Patent: *Jan. 24, 2023

(54) VIDEO START-TIME REDUCTION EMPLOYING REDUCTIVE EDGING PRINCIPLES

(71) Applicant: Sony Interactive Entertainment LLC, San Mateo, CA (US)

(72) Inventors: Bhumik Sanghavi, Santa Clara, CA (US); Joel Freeman, San Rafel, CA (US); Alex Hwang, Orinda, CA (US); Sri Sreedharan, San Francisco, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/143,596

(22) Filed: Jan. 7, 2021

(65) Prior Publication Data

US 2021/0235136 A1    Jul. 29, 2021

Related U.S. Application Data

(63) Continuation of application No. 16/191,341, filed on Nov. 14, 2018, now Pat. No. 10,911,793.

(51) Int. Cl.
*H04N 21/234* (2011.01)
*H04N 21/262* (2011.01)
(Continued)

(52) U.S. Cl.
CPC ..... *H04N 21/23406* (2013.01); *H04L 63/062* (2013.01); *H04L 65/65* (2022.05);
(Continued)

(58) Field of Classification Search
CPC ....... H04N 21/23406; H04N 21/26258; H04N 21/23109; H04L 65/608; H04L 63/062;
(Continued)

(56) References Cited

U.S. PATENT DOCUMENTS 8,244,874 B1    8/2012 Thireault
2001/0014103 A1    8/2001 Burns et al.
(Continued)

FOREIGN PATENT DOCUMENTS

CN    105191184 A    12/2015
EP    3063944 B1    5/2020

OTHER PUBLICATIONS

Final Office Action for U.S. Appl. No. 16/191,341, dated May 11, 2020.
(Continued)

*Primary Examiner* — Nam D Pham
(74) *Attorney, Agent, or Firm* — JDI Patent; Joshua Isenberg; Robert Pullman

(57) ABSTRACT

Prior to receiving a request from a client device for information from a content distribution network (CDN), a Reductive Edging device predictively requests the information from the CDN based on prior user activity and stores it in memory. The Reductive Edging device is thus configured to respond to the request from the client device for information from the CDN with the information stored in the memory prior to receiving the request.

20 Claims, 6 Drawing Sheets

(51) Int. Cl.
  *H04L 9/40* (2022.01)
  *H04N 21/231* (2011.01)
  *H04L 65/65* (2022.01)
  *H04L 67/5681* (2022.01)

(52) U.S. Cl.
  CPC ... *H04L 67/5681* (2022.05); *H04N 21/23109* (2013.01); *H04N 21/26258* (2013.01)

(58) Field of Classification Search
  CPC . H04L 67/2847; H04L 65/4084; H04L 67/02; H04L 67/1097
  See application file for complete search history.

(56) References Cited

U.S. PATENT DOCUMENTS

| | | |
|---|---|---|
| 2009/0150518 A1 | 6/2009 | Lewin et al. |
| 2010/0299722 A1 | 11/2010 | Tewari et al. |
| 2011/0066676 A1* | 3/2011 | Kleyzit ............... H04L 67/289 709/203 |
| 2014/0281707 A1 | 9/2014 | Su et al. |
| 2014/0380050 A1 | 12/2014 | Dharmarajan et al. |
| 2015/0365450 A1 | 12/2015 | Gaunt et al. |
| 2018/0160159 A1 | 6/2018 | Asarikuniyil |
| 2018/0241836 A1 | 8/2018 | Arsenault et al. |
| 2020/0154155 A1 | 5/2020 | Sanghavi et al. |

OTHER PUBLICATIONS

International Search Report & Written Opinion dated Dec. 31, 2019 for International Patent Application No. PCT/US2019/053599.
Non-Final Office Action for U.S. Appl. No. 16/191,341, dated Jan. 24, 2020.
Notice of Allowance for U.S. Appl. No. 16/191,341, dated Sep. 24, 2020.
Pantos R. et al. "HTTP Live Streaming" RFC8216, IETF, ISSN 2070-1721. Aug. 2017.
Extended European Search Report for Application No. 19885414.3, dated Jun. 24, 2022.
Japanese Office Action for Country Code Application No. 2021-523185, dated Jul. 20, 2022.
Office Action dated Mar. 14, 2022 for Chinese patent application No. 201980075278.6.

* cited by examiner

_US 11,563,987 B2_

VIDEO START-TIME REDUCTION EMPLOYING REDUCTIVE EDGING PRINCIPLES

CLAIM OF PRIORITY

This application is a continuation of U.S. patent application Ser. No. 16/191,341 filed Nov. 14, 2018, the entire contents of which are incorporated herein by reference.

FIELD OF THE DISCLOSURE

The present disclosure relates online media streaming. Specifically the present disclosure relates to enhancement of HTTP Live Streaming (HLS).

BACKGROUND OF THE INVENTION

Over the top video streaming is becoming ever more popular in comparison to television. While popular, over the top (OTT) video streaming does have several downsides in comparison to broadcast and cable television. Specifically adaptive bitrate streaming, e.g., adaptive bitrate streaming, requires a connection handshaking and playlist collection.

Additionally, streaming video applications must download and buffer the video data and its related manifests before the video can be played. Thus, there is typically some delay between when a user chooses a streaming video to watch and when the video is actually played. This delay can be frustrating to users especially during times of high network congestion or slow network condition.

In addition, it would be desirable to implement a single solution to reduce video start-time across multiple devices, such as PS4, Roku, Apple-TV, Android Mobile, and the like. However, an impediment to such a solution arises from the fact that all HTTP requests need to go through connection, setup, and handshaking operations. HTTP generally is stateless therefore does not always remember or leverage information from previous requests. The major drawback is that servers are not optimized for many adaptive bitrate streaming protocols because they do not take advantage of mostly predicable request patterns. It is also difficult or infeasible for all playback clients to implement all networking optimizations when interacting with the servers.

It is within this context that embodiments of the present disclosure arise.

BRIEF DESCRIPTION OF THE DRAWINGS

The aspects of the present disclosure can be readily understood by considering the following detailed description in conjunction with the accompanying drawings, in which.

DESCRIPTION OF THE SPECIFIC EMBODIMENTS

Figure 1A:
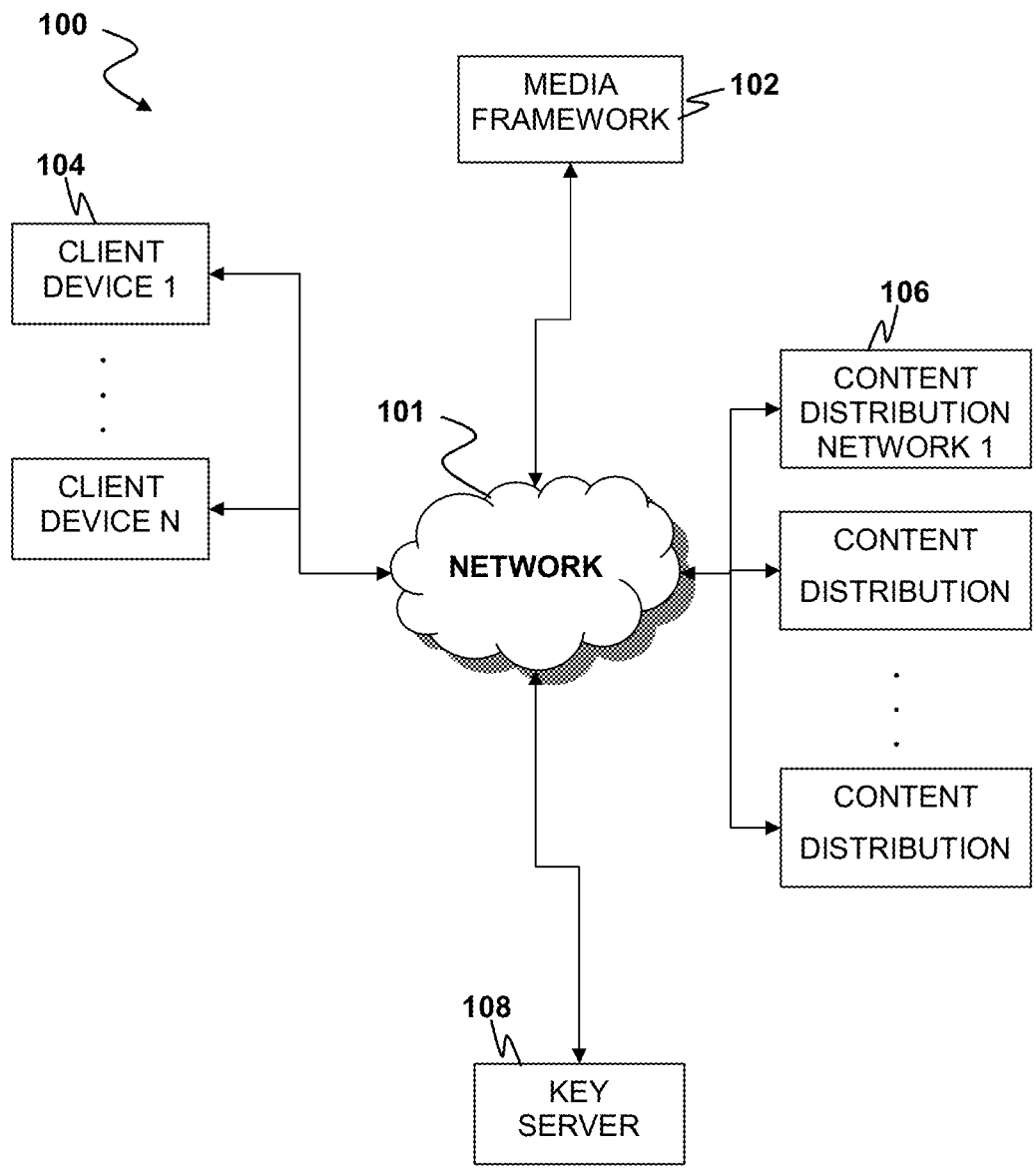
FIG. 1A shows the general architecture of an adaptive bit rate (ABR) multimedia streaming system.

Although the following detailed description contains many specific details for the purposes of illustration, anyone of ordinary skill in the art will appreciate that many variations and alterations to the following details are within the scope of the disclosure. Accordingly, examples of embodiments of the disclosure described below are set forth without any loss of generality to, and without imposing limitations upon, the claimed disclosure.

While numerous specific details are set forth in order to provide a thorough understanding of embodiments of the disclosure, it will be understood by those skilled in the art that other embodiments may be practiced without these specific details. In other instances, well-known methods, procedures, components and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm, as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

INTRODUCTION

Aspects of the present disclosure address the drawbacks associated with existing adaptive bitrate streaming systems through use of a reductive edger to address parity performance issues in a cross-platform client environment. Video is consumed on variety of client devices that have relatively equal capability when it comes to handling adaptive bitrate streaming.

The problem, referred to herein as the "edging" problem is how to make all these cross-platform clients equally capable at accessing contents hosted by a content delivery network (CDN). It is not likely nor reasonable to assume these devices can all implement all advanced edging techniques. Reductive Edging architecture according to aspects of the present disclosure provides edge intelligence in a component external to client devices or client applications so the client can capably use advanced edging technology without having to radically reconfigure a client device or application.

A related issue is one of "playback robustness", i.e., the ability of a client device or application to handle adaptive bitrate stream efficiently. This is non-trivial, especially in dealing with fringe syntax and features, latency, errors, adaptive bit rate, etc. This is even more complex than the edging issue.

Reductive Edging techniques, as described herein, relieve client devices and applications of edging and robustness responsibilities and allow them to perform well at simpler tasks. A Reductive Edger that takes over these responsibilities is the salient feature of aspects of the present disclosure.

Adaptive Bitrate Streaming Architecture

FIG. 1A shows the general architecture of an adaptive bit rate (ABR) multimedia streaming system 100. Examples of common protocols for ABR streaming multimedia on personal computers, set-top television devices, phones, and tablets include HTTP Live streaming (HLS) and Dynamic Adaptive Streaming over HTTP (DASH). The multimedia streaming system 100 comprises a media framework 102, a content distribution network and server 106, Key server 108, and client devices 104 connected over a network 101.

The content distribution network (CDN) 106 comprises multiple servers and data servers that are configured to provide efficient multi-media content to geographically dispersed client devices 104 over the network 101. The Key server 108 provides encryption keys to the client devices 104. The encryption keys are used to decrypt the media content from the CDN 106, which may be, encrypted for digital rights management (DRM) purposes. The Media Framework 102 provides the network 101 location of the video content delivered by the CDN 106 through a Uniform Resource Locator (URL) or the like.

Figure 1B:
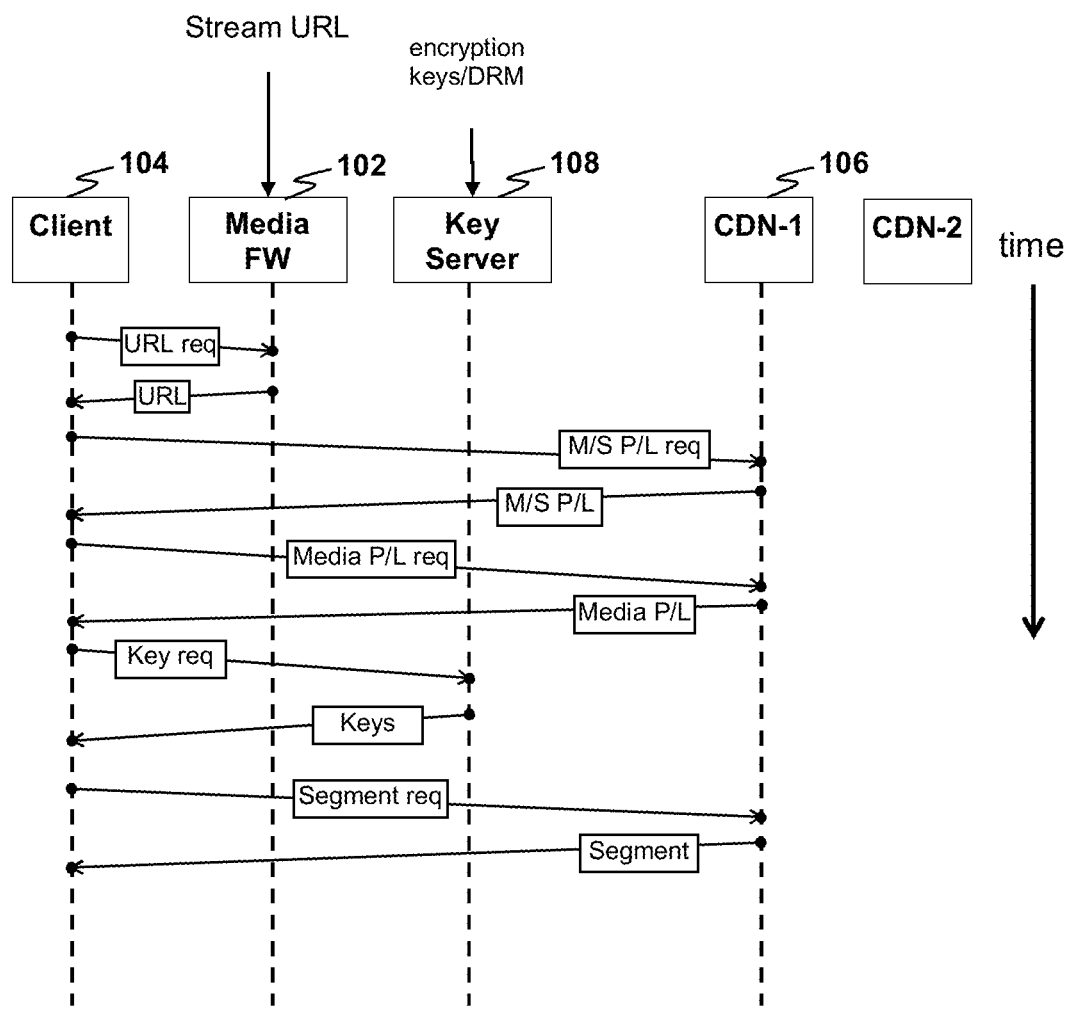
FIG. 1B shows the operation of a prior art client device in the HLS system of FIG. 1A.

FIG. 1B shows the operation of a prior art client device in the HLS system 100. Before media can be played on the client device 104, the client device 104 sends a request to the media framework 102 for the location of a media stream on the CDN 106. The media framework 102 sends the location of the CDN 106 back to the client device 104. This location may be, for example and without the limitation, in the form of a URL, internet protocol address (IP address) or similar.

The client device 104 then contacts the CDN 106 with a request for the Master Playlist. The Master Playlist provides a list containing the locations of the media presentation at different bitrates, in different formats or with alternate renditions of the content. The CDN 106 then responds by sending the Master Playlist back to the client device 104.

The client device may then choose a particular rendition of a media presentation. This may be done via the client's ABR mechanism to computationally and dynamically determine the optimal bit rate selection and corresponding rendition. In response to a choice of rendition the client device 104 sends a request to the CDN 106 for a media playlist, The media playlist provides a list containing the location of the keys and video segments of the media presentation at a particular format, bit-rate, etc. The CDN 106 sends the media playlist and it is received at the client device 104.

In preparation for media playback of an encrypted stream, the client device 104 may contact a key server 108 by sending a request for encryption key specific to the media presentation video segments. The key server 108 then sends the requested key, which is received by the client device 104. This procedure is optional as not all streams are encrypted, and with other forms of security, there may not be keys.

The client device begins streaming the media presentation by sending a request for a media segment to the CDN 106. The CDN 106 in kind begins sending media segments, which are received at the client device 104. The media segments are encoded audio, closed captioning data, meta and control data and/or video segments of a media presentation that when played together in sequence creates the full-length media presentation. The media segments may be encoded, in which case the client device may use the key received from the key server to decrypt the media segment and begin playback. For more information on the HLS system architecture see: Pantos, R. P. "HTTP Live Streaming," Request for Comments 8216, Network Working Group: 1, Available at: https://tools.ietf.org/html/rfc8216 (August 2017) which is incorporated herein by reference.

Reductive Edgeing Enhanced Streaming

Figure 2A:
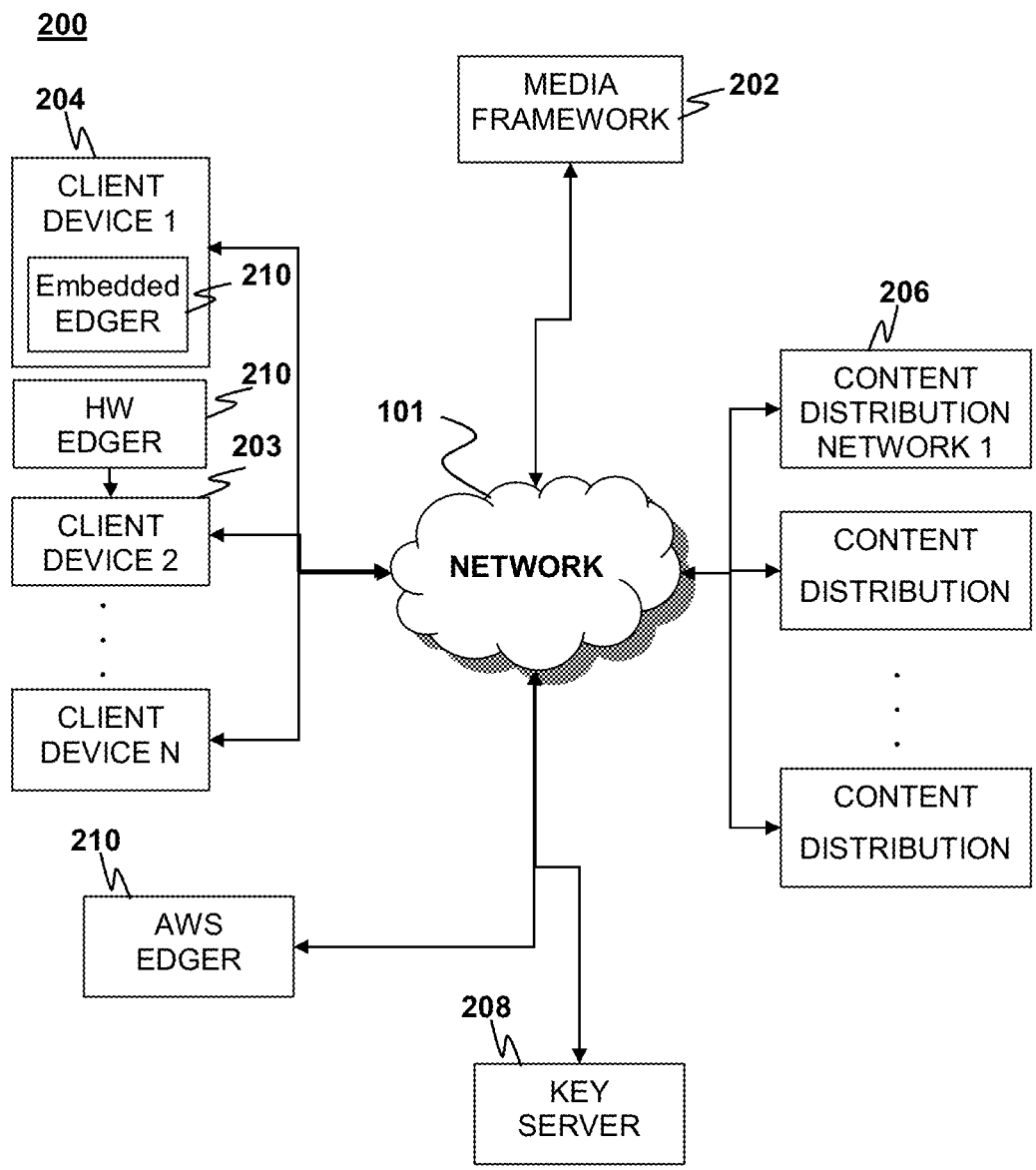
FIG. 2A shows an HLS system enhanced with Reductive Edging according to aspects of the present disclosure.

FIG. 2A shows a HLS system enhanced with Reductive Edging according to aspects of the present disclosure. The user experience for HLS based streaming may be enhanced with faster device startup time and reduced buffering times using a Reductive Edging device or embedded devices 210. 64% faster buffering times and 60% faster start up times have been achieved using embodiments of the present disclosure.

Reductive Edging may be performed by client devices 204 having embedded Reductive Edging devices 210 or by client devices 203 connected to a local Reductive Edging device 210 or by a client device in communication with the Reductive Edging device 210 over a network 101. Embedded Reductive Edging devices may be created within specialized circuitry of the client device or as a separate specialized module with specialized instructions, processor and memory coupled to the processor of the client device through for example a communication bus. In some implementations, Reductive Edging may be implemented as a software service on a device or its operating system (OS).

The network may be for example and without limitation, the internet, a Local Area Network (LAN) or some other type of Wide Area Network (WAN). The prefetching device may be in communication over a network 101 with the media framework 202, the key server 208, the CDN 206 or any combination thereof during operation. In some implementation, the prefetching device may communicate through the client device. For example, the media-prefetching device may use a network interface of the client device to communicate with servers over the network 101.

Figure 2B:
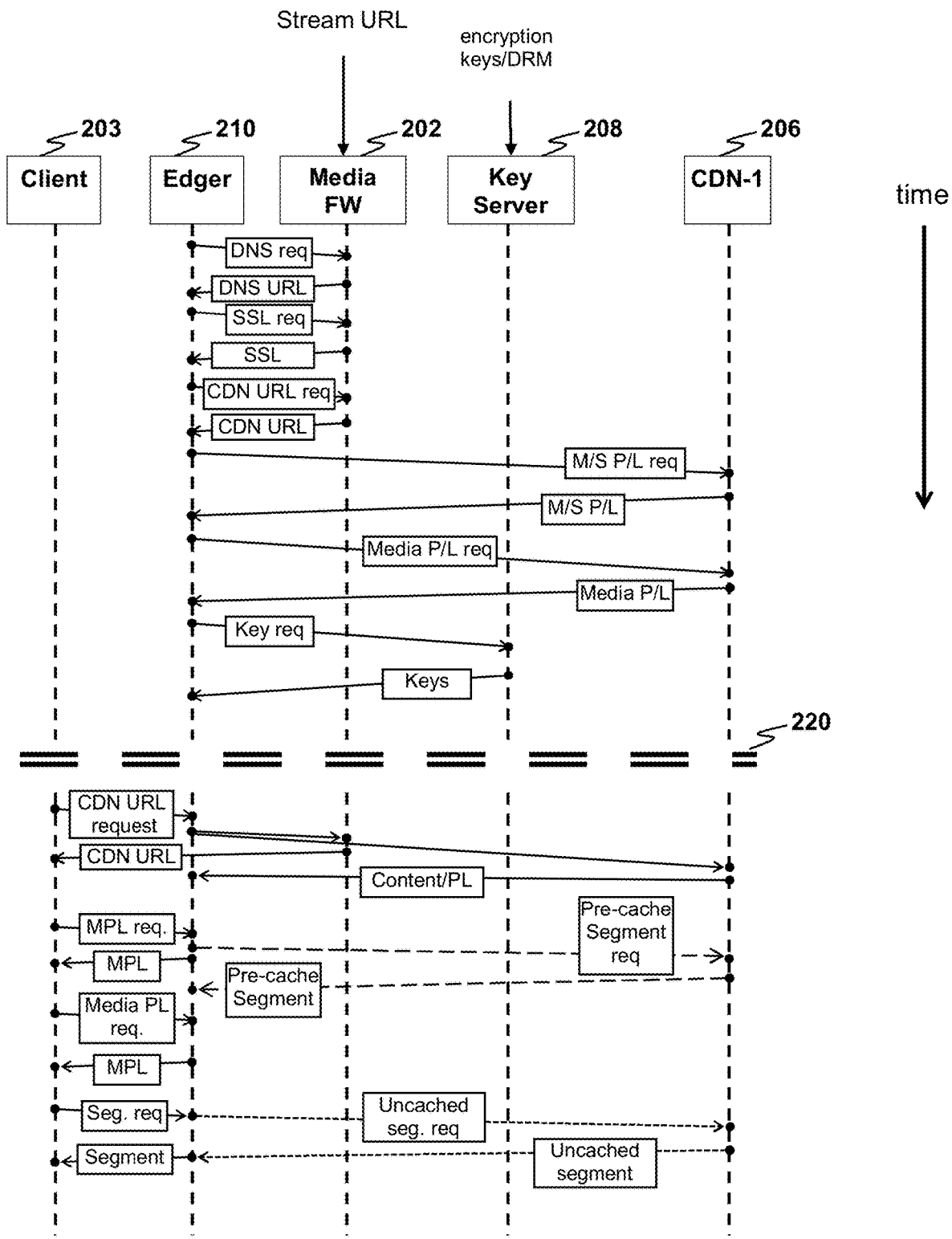
FIG. 2B depicts a method of operation of a Reductive Edging device in communication with a client device according to aspects of the present disclosure.

FIG. 2B depicts the method of operation of the Reductive Edging device in communication with a client device according to aspects of the present disclosure. The Media Prefetching device begins operation before the client device begins communication with the servers hosting HLS data as indicated by the double line 220. In some implementations, the client device may not be powered while the Reductive Edging performs the operation above the double line 220.

The Reductive Edging device 210 may begin operation by sending a request to the domain name system (DNS) for the location of the Media Framework Server 202. The DNS sends the location, typically in the form of an IP address, of the Media Framework Server back the to the Reductive Edging device 210, where it is received. In some implementations, the Reductive Edging device 210 may contact a trusted source and download a secure socket layer (SSL)

certificate for encrypted communication. This trusted source may be part of the media framework 202. The SSL certificate is used during communication with SSL enabled servers to encrypt communication. This encryption ensures that communications made by the server to the client and vice versa, intercepted by third parties will be unintelligible.

The Reductive Edging device 210 may then send a request to the Media Framework 202 for the location of the CDN. The Media Framework 202 may return the location of the CDN to the Reductive Edging device 210. The CDN location is then stored and used for subsequent communications. The Reductive Edging device 210 sends a communication through the network to the CDN 206 requesting the Master Playlists. In response, the CDN 206 sends the Master Playlists through the network where it is received by the Reductive Edging device 210. The Reductive Edging device 210 then stores the Master Playlist.

As discussed above the Master Playlist contains a list of locations of a media presentation at different bitrates, in different formats or with alternate versions of the content. The number of different media presentations on the CDN 206 is finite. Therefore to accelerate the streaming process, in some implementations the Media Pre-fetcher may request a Master Playlist comprising every Media Presentation on the CDN 206. The Master playlists are then stored in memory or mass storage. In some implementations, the Reductive Edging device 210 may predictively request Master Playlists to reduce download time and memory space required for the Master Playlists. For Example and without limitation the Reductive Edging device may track the user's viewing habits in a table so that the device has a record of what piece of content the user last viewed. The device may download the Master list for that content before the user request to view the content or even starts the client device. Similarly, for games the system may track games the user frequently plays and download a master list for if playtime or number of sessions for the game is above a certain threshold. Note that while this implementation is described in the context of games it may also be applied to other media types such as video or music.

Once the Master Playlist is received at the Reductive Edging Device 210, a request may be sent to the CDN 206 for Media Playlists by the Reductive Edging device 210. Similar to the Master Playlist, there are a finite number of Media presentations on the CDN 206. Therefore, the Reductive Edging device may request a media playlist for every media presentation on the CDN 206. Predictive methods may also be used to reduce the number of content playlists downloaded. The Predictions methods for prospective fetching of content lists are substantially similar to those described above with respect to the master playlist. With the caveat that the tracking of user activity for Content Playlist must be more granular because the Content Playlist represents a particular media presentation whereas the Master Playlist represents a set of media presentations having, different bitrates, different formats or alternate versions of the content.

After the CDN 206 receives the request for Media Playlists, it sends the Media Playlists through the network to the Reductive Edging device 210. The Media Playlists are received by the Reductive Edging device 210 and stored either in memory or in mass storage.

The Reductive Edging device 210 may then request keys from the Key Server 208 for each media playlist received from the CDN 206. These keys are stored in memory or in mass storage after they are received by the Reductive Edging device 210 from the Key server 208.

Once the user initiates the streaming system on the client device 203 communication between the client device 203 and the Reductive Edging device 210 may begin. The client device may be configured to communicate with the Reductive Edging device as though it were part of the media framework and in the content delivery network. Thus, the Reductive Edging device 210 may receive a request for the CDN location from the client device 203. The Reductive Edging device 210 forwards the request to the Media Framework 202. The Media framework 202 replies with the CDN location, which is received by the client device 203. Concurrently the Reductive Edging device 210 sends a content playlist request to the CDN 206. The CDN 206 sends the content playlist and the content playlist is received by the Reductive Edging device 210.

After receipt of the CDN location, the client device 203 sends a request for a master playlist from the Reductive Edging device 210. The client device 203 may be configured to request Playlists from the Reductive Edging device 210 before contacting the CDN 206 or instead of the CDN 206. After receiving the request for a master playlist, the Reductive Edging device 210 may send the requested master playlist to the client device 203. The Reductive Edging device already has every master playlist in memory as the device has received all of the master playlists from the CDN earlier. In implementations, that predictively request master playlists the memory contains master playlists likely to be requested as such there is the possibility that the prediction was incorrect and in such a case the request will be forwarded to the CDN 206.

After receiving the master playlist request, the Reductive Edging device 210 may also send a request to the CDN 206 for media segments for prospective caching. In some implementations, the Reductive Edging device 210 may request media segments for every media playlist in the master playlist that was request by the client device 203. In other implementations, the Reductive Edging device 210 may track the most recently requested media playlist and may request media segments from the same media playlist or a congruent media playlist. By way of example and not by way of limitation the Reductive Edging device may keep a table of the five most recently requested media playlists, media segments downloaded etc. There may be some meta-information about each media playlist for example, the table entry may have information about the order in which media playlists are typically requested and information about the location next media playlist likely to be requested i.e. "Previous Watched: Breaking Bad Episode 1—Next episode: Breaking Bad Episode 2—Location of Next Episode: Location.Location." The Reductive Edging device may request media segments from media congruent with the meta-information, for example and without limitation the next episode in the series. In other implementations, the table may track user preferences such as Language, and connection speed and request media segments from the Master List that match those preferences.

The CDN 206 begins sending media segments to the Reductive Edging device 210 after the request for media segments is received. The Reductive Edging device 210 receives and stores the media segments from the CDN 206. The media segments may be stored in memory, for example in a buffer or in Mass Storage.

The Client device 203 may request a media playlist from the Reductive Edging device 210. In response the Reductive Edging device 210 may send the media playlist to the Client device 203. The Reductive Edging device 210 already has all of the media playlists for the requested master playlist in memory and therefore only needs to retrieve the requested media playlist from memory.

Next, the client device 203 may request a media segment from the Reductive Edging device 210. When the request for a media segment is received at the Reductive Edging device 210, it may query its memory or mass storage for the media segment. If the media segment is found, the Reductive Edging device sends the segment to the client device 203. If the media segment is not found a request for the media segment is sent to the CDN 206. Upon receiving the request for a media segment, the CDN sends the requested media segment to the Reductive Edging device 210. The Reductive Edging device 210 stores the media segment in memory or mass storage after receiving the media segment. The newly stored media segment may then be sent to the client device 203. As discussed above the media segment may be encrypted as part of the DRM protection, therefore as part of the storage process the Reductive Edging device 210 decrypts the media segments with the correct key received from the key server. In other implementations, the media segments may be decrypted before being sent to the client device. Once media segments are being sent from the CDN 206 and received at the Reductive Edging device 210 the Reductive Edging device 206, may store media segments ahead of the client device 203 and send them to the client 203 device as necessary.

Standalone Reductive Edging System

Figure 3:
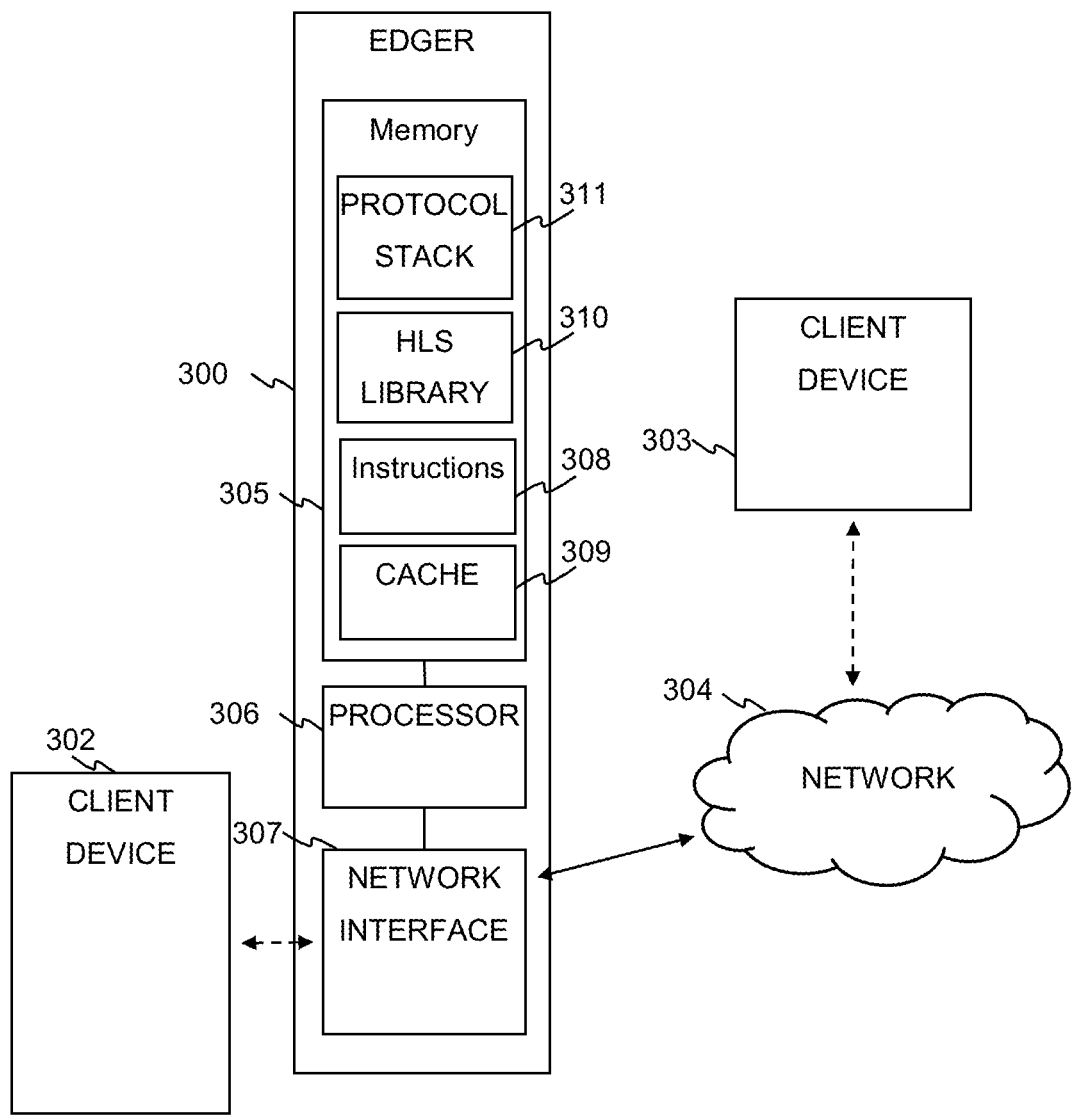
FIG. 3 shows a standalone Reductive Edging device according to aspects of the present disclosure.

FIG. 3 shows a standalone Reductive Edging device according to aspects of the present disclosure. The standalone Reductive Edging device or Edger 300 may be coupled to a local client device 302 through a network interface 307 over a LAN or WAN. In other alternative implementation the standalone Reductive Edging device may be in communication through the network interface 307 with a non-local device 303 e.g., servers or another client, through a large network 304 such as the internet. In some implementations the client device is connected to the stand alone Reductive Edging device through a communication bus (not shown) such as, without limitation, a peripheral interconnect (PCI) bus, PCI express bus, Universal Serial Bus (USB), Ethernet port, Fire-wire connector or similar interface.

The standalone Reductive Edging device 300 may include one or more processor units 306, which may be configured according to well-known architectures, such as, e.g., single-core, dual-core, quad-core, multi-core, processor-coprocessor, cell processor, and the like. The standalone Reductive Edging device 300 may also include one or more memory units 305 (e.g., random access memory (RAM), dynamic random access memory (DRAM), read-only memory (ROM), and the like).

The processor unit 306 may execute one or more instructions 308, portions of which may be stored in the memory 305 and the processor 306 may be operatively coupled to the memory through a bus or bus type connection. The instructions 308 may be configured to implement the method for prefetching in a HLS systems shown in FIG. 2B. Additionally the Memory 305 may contain instructions for storing Playlists in a HLS Library and a Protocol Stack defining HLS server locations. The Memory 305 may also contain the HLS Library 310 and the Protocol Stack 311. The instructions 308 may further implement storage of media segments in a cache 309 during operation. The Cache 309 may also be located in memory 305.

The standalone Reductive Edging device 300 may include a network interface 307 to facilitate communication via an electronic communications network 304. The network interface 307 may be configured to implement wired or wireless communication over local area networks and wide area networks such as the Internet. The device 300 may send and receive data and/or requests for files via one or more message packets over the network 304. Message packets sent over the network 304 may temporarily be stored in a cache 309 in memory 305. The client device 302 may connect through the network interface 307 to the electronic communications network 304. Alternatively, the client device 303 may be in communication with the standalone Reductive Edging device 300 over the electronic communication network 304.

Embedded Reductive Edging System

Figure 4:
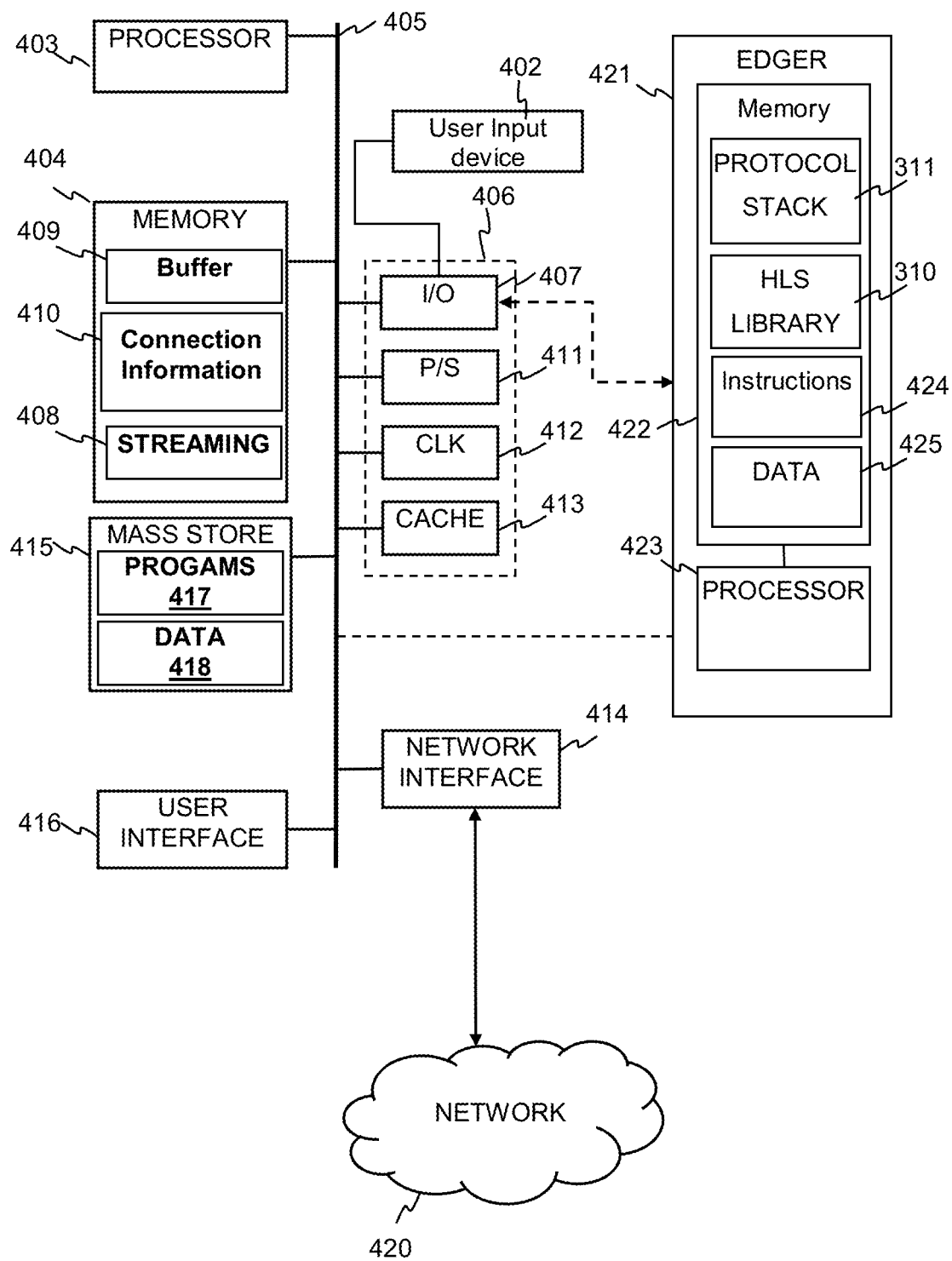
FIG. 4 depicts an embedded Reductive Edging system according to aspects of the present disclosure.

FIG. 4 depicts an embedded Reductive Edging system according to aspects of the present disclosure. The embedded Reductive Edging system may include a client computing device 400 coupled to a user input device 402. The user input device 402 may be a controller, touch screen, microphone, keyboard, mouse, joystick or other device that allows the user to input information including sound data in to the system.

The client device of the embedded Reductive Edging system 400 may include one or more processor units 403, which may be configured according to well-known architectures, such as, e.g., single-core, dual-core, quad-core, multi-core, processor-coprocessor, cell processor, and the like. The computing device may also include one or more memory units 404 (e.g., random access memory (RAM), dynamic random access memory (DRAM), read-only memory (ROM), and the like).

The processor unit 403 may execute one or more programs, portions of which may be stored in the memory 404 and the processor 403 may be operatively coupled to the memory, e.g., by accessing the memory via a data bus 405. The programs may be configured to implement streaming media through HLS systems 408. Additionally the Memory 404 may contain information about connections between the system and one or more streaming servers 410. The Memory 404 may also contain a buffer of media segments 409. The Media segments and connection information may also be stored as data 418 in the Mass Store 418.

The computing device 400 may also include well-known support circuits, such as input/output (I/O) 407, circuits, power supplies (P/S) 411, a clock (CLK) 412, and cache 413, which may communicate with other components of the system, e.g., via the bus 405. The computing device may include a network interface 414. The processor unit 403 and network interface 414 may be configured to implement a local area network (LAN) or personal area network (PAN), via a suitable network protocol, e.g., Bluetooth, for a PAN. The computing device may optionally include a mass storage device 415 such as a disk drive, CD-ROM drive, tape drive, flash memory, or the like, and the mass storage device may store programs and/or data. The computing device may also include a user interface 416 to facilitate interaction between the system and a user. The user interface may include a monitor, Television screen, speakers, headphones or other devices that communicate information to the user.

The computing device 400 may include a network interface 414 to facilitate communication via an electronic communications network 420. The network interface 414 may be configured to implement wired or wireless communication over local area networks and wide area networks such as the Internet. The device 400 may send and receive data and/or requests for files via one or more message packets over the network 420. Message packets sent over the network 420 may temporarily be stored in a buffer 409 in memory 404.

In some implementations, the embedded Reductive Edging or embedded Edger 421 may be an embedded hardware component of client device 400, which may be coupled to the main processor via the bus and requests may be received from applications, e.g., streaming applications, running on the client device. In some implementations, the embedded Edger 421 may initiate and intercept network communications directed toward a CDN or other servers. In these implementations, the embedded Edger 421 may lack a network interface or the network interface may not be used. In other implementations, the embedded Edger, the functions of the edger may be implemented in streaming software 408 stored in the memory 404 or in programs 417 stored in the mass store 415 and executed on the processor 403.

In some alternative implementation the embedded Edger 421 may be an external device coupled to the client device 400, e.g., via a local non-network connection, such as the I/O functions 407.

The processor of the embedded Edger unit 421 may execute one or more instructions 424, portions of which may be stored in the edger memory 422 and the processor 423 may be operatively coupled to the memory 422 through a bus or bus type connection. The instructions 424 may be configured to implement the method for prefetching in a HLS systems shown in FIG. 2B. Additionally the Memory 422 may contain instructions for storing Playlists in a HLS Library and a Protocol Stack defining HLS server locations. The Memory 422 may also contain the HLS Library 310 and the Protocol Stack 311. The instructions 424 may further implement storage of media segments as data 425 during operation. Alternatively, the HLS Library, Protocol stack and media segments may be stored on the client device 400 in the buffer 408 or as connection information 408 in memory 404 or as data 418 in the Mass Store 415.

While the above is a complete description of the preferred embodiment of the present disclosure, it is possible to use various alternatives, modifications and equivalents. It is to be understood that the above description is intended to be illustrative, and not restrictive. For example, while the flow diagrams in the figures show a particular order of operations performed by certain embodiments of the disclosure, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. The scope of the disclosure should therefore be determined with reference to the appended claims, along with the full scope of equivalents to which such claims are entitled. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A Reductive Edging device comprising;
   a processor;
   memory coupled to the processor;
   non-transitory instructions embedded in the memory that when executed by the processor cause the device to perform a method for Reductive Edging, the method comprising;
      prior to receiving a request from a client device for information from a content distribution network (CDN), predictively requesting the information from the CDN and storing the information in memory based on prior user activity;
      whereby the Reductive Edging device is configured to respond to the request from the client device for information from the CDN with the information stored in the memory prior to receiving the request.

2. The Reductive Edging device of claim 1, wherein the information from the CDN is a master playlist.

3. The Reductive Edging device of claim 1, wherein the information from the CDN is a media playlist.

4. The Reductive Edging device of claim 1, wherein the method further comprises: prior to receiving the request from the client device, requesting and receiving a media encryption key from a key server and storing the media encryption key in the memory.

5. The Reductive Edging device of claim 1, wherein the non-transitory instructions embedded in the memory further comprise
   one or more instructions that, when executed, causes the Media-Pre-fetching device to respond to a request from a client device for information from the CDN with the information stored in memory.

6. The Reductive Edging device of claim 5, wherein responding to the request with the information stored in memory includes forwarding a CDN location to a media framework server.

7. The Reductive Edging device of claim 5, wherein responding to the request with the information stored in the memory includes requesting and receiving a content playlist from the CDN and sending the content playlist to the client device.

8. The Reductive Edging device of claim 5, wherein the information from the CDN is a master playlist and wherein responding to the request with the information stored in memory includes sending the master playlist to the client device.

9. The Reductive Edging device of claim 5, wherein the information from the CDN is a media playlist and wherein responding to the request with the information stored in memory includes sending the media playlist to the client device.

10. The Reductive Edging device of claim 1, wherein the non-transitory instructions embedded in the memory further comprise
    one or more instructions that, when executed, causes the Media-Pre-fetching device to request and receive a media segment from the CDN and store the media segment in memory.

11. The Reductive Edging device of claim 10, wherein the instructions further comprise one or more instructions that, when executed, causes the Media-Pre-fetching device to send the stored media segment to the client device.

12. The Reductive Edging device of claim 10, wherein the instructions further comprise one or more instructions that, when executed, causes the Media-Pre-fetching device to request the media segment from the CDN before receiving a media segment request from the client device.

13. The Reductive Edging device of claim 12, wherein the instructions further comprise one or more instructions that, when executed, causes the Media-Pre-fetching device to request un-stored media segments from the CDN.

14. The Reductive Edging device of claim 12, wherein the instructions further comprise one or more instructions that, when executed, causes the Media-Pre-fetching device to request un-stored media segments from the CDN after receiving a media segment request from the client device.

15. The Reductive Edging device of claim 1, further comprising a network interface coupled to the processor and configured to connect the Reductive Edging device to a network, wherein the non-transitory instructions embedded in the memory include one or more instructions for handling requests from the client device received from the client over the network via the network interface.

16. The Reductive Edging device of claim 1, further comprising a local connection coupled to the processor and configured to connect the Reductive Edging device to the client device, wherein the non-transitory instructions embedded in the memory include one or more instructions for handling requests from the client device received from the client via the local connection.

17. The Reductive Edging device of claim 1, wherein the Reductive Edging device is an embedded hardware component of the client device and wherein Reductive Edging device is configured to receive requests from an application running on the client device.

18. The Reductive Edging device of claim 1, wherein the Reductive Edging device is implemented as an embedded software component of the client device and wherein Reductive Edging device is configured to receive requests from an application running on the client device.

19. Instructions embodied in a non-transitory computer readable medium that when executed by a processor cause the processor to implement the method comprising:
   prior to receiving a request from a client device for information from a content distribution network (CDN), predictively requesting the information from the CDN and storing the information in memory based on prior user activity;
   responding to the request from the client device for information from the CDN with the information stored in memory prior to receiving the request.

20. A method for Reductive Edging comprising:
   prior to receiving a request from a client device for information from a content distribution network (CDN), predictively requesting the information from the CDN and storing the information in memory based on prior user activity;
   respond to the request from the client device for information from the CDN with the information stored in the memory.

* * * * *